(12) United States Patent
Bork et al.

(10) Patent No.: US 7,497,335 B2
(45) Date of Patent: Mar. 3, 2009

(54) HYDROGRAVITY SYSTEM AND PROCESS

(75) Inventors: Joseph E. Bork, Westlake, OH (US); Stephen C. Paspek, Jr., Broadview Heights, OH (US); Alan Schroeder, Cleveland, OH (US)

(73) Assignee: Broadview Group LLC, Westlake, OH (US)

(*) Notice: Subject to any disclaimer, the term of this patent is extended or adjusted under 35 U.S.C. 154(b) by 434 days.

(21) Appl. No.: 11/301,003

(22) Filed: Dec. 12, 2005

(65) Prior Publication Data

US 2006/0118469 A1    Jun. 8, 2006

Related U.S. Application Data

(63) Continuation-in-part of application No. 11/047,114, filed on Jan. 31, 2005, which is a continuation-in-part of application No. 10/774,158, filed on Feb. 6, 2004, now abandoned.

(51) Int. Cl.
    *B03B 5/00* (2006.01)
(52) U.S. Cl. ............. 209/172; 209/3.1; 209/172.5; 209/188
(58) Field of Classification Search ............. 209/172, 209/3.1, 172.5, 188; 241/9, 20
    See application file for complete search history.

(56) References Cited

U.S. PATENT DOCUMENTS

| | | | | |
|---|---|---|---|---|
| 2,530,823 | A * | 11/1950 | Kilander et al. | 127/25 |
| 3,479,378 | A * | 11/1969 | Kirkpatrick et al. | 556/24 |
| 4,033,765 | A * | 7/1977 | Gerlach | 75/373 |
| 4,071,479 | A | 1/1978 | Broyde et al. | |
| 4,095,975 | A * | 6/1978 | Rappas et al. | 75/370 |
| 5,740,918 | A | 4/1998 | Hayashi et al. | |
| 5,951,712 | A * | 9/1999 | Campbell | 264/37.33 |
| 6,228,479 | B1 | 5/2001 | Zegler et al. | |
| 6,329,436 | B1 | 12/2001 | Jody et al. | |
| 6,335,376 | B1 | 1/2002 | Allen, III et al. | |
| 6,336,959 | B1 * | 1/2002 | Kamo | 95/241 |
| 6,460,788 | B1 * | 10/2002 | de Feraudy | 241/19 |
| 6,596,053 | B2 * | 7/2003 | Virnig et al. | 75/740 |
| 2003/0061910 | A1 * | 4/2003 | Virnig et al. | 75/721 |
| 2004/0004033 | A1 | 1/2004 | Vandeputte | |
| 2005/0109697 | A1 * | 5/2005 | Olivier | 210/610 |

FOREIGN PATENT DOCUMENTS

DE    2107268    8/1972

(Continued)

*Primary Examiner*—Patrick H Mackey
*Assistant Examiner*—Terrell H Matthews
(74) *Attorney, Agent, or Firm*—Rankin, Hill & Clark LLP (57) ABSTRACT

Hydrogravity separation of a multiple domain solid feedstock is disclosed which comprises granulating the feedstock to produce particles each of substantially a single domain, with each type of particle having a different density. The particles are slurried into a suitable fluid. A dispersion mixer having a high shear and/or turbulent zone is utilized to disperse agglomerated particles and a quiescent hydrogravity tank is utilized to effect binary separation of the mixture of particles into a stream with a higher average specific gravity, and a stream with a lower average specific gravity. A high degree of product purity is obtained by feeding one or both of the initial product streams to a collection of dispersion mixer/hydrogravity tank units using a fluid of substantially the same specific gravity.

44 Claims, 4 Drawing Sheets

FOREIGN PATENT DOCUMENTS

| | | |
|---|---|---|
| EP | 0431582 | 6/1991 |
| EP | 1225019 | 7/2002 |
| GB | 0304667 | 3/1989 |
| JP | 06134762 | 5/1994 |
| WO | 02/085523 | 10/2002 |
| WO | WO 02/085523 | 10/2002 |

\* cited by examiner

HYDROGRAVITY SYSTEM AND PROCESS

CROSS-REFERENCE TO RELATED PATENTS

This application is a continuation-in-part of U.S. application Ser. No. 11/047,114 filed on Jan. 31, 2005 which is a continuation-in-part of U.S. Ser. No. 10/774,158 filed on Feb. 6, 2004 now abandoned.

BACKGROUND

The present invention relates to reclaiming one or more solid components, such as plastics, metal, etc. from a multiple domain solid feedstock. The solid components can initially be physically bonded to each other, but should differ in specific gravity. More specifically, the present invention relates to using a series of two or more sets of dispersion mixers and hydrogravity tanks to recover one or more products in a more purified form than can be achieved by a simple "float/sink" process. The hydrogravity tanks utilize an aqueous solution having a specific gravity between that of the particles in the feedstock mixture.

In the past, plastics have been separated from other plastics or non-plastic materials by selectively dissolving the plastics of interest by certain solvents and then separating from other plastics or the non-plastic materials by filtration. This technique typically requires high temperatures, and has a host of additional potential problems with solvent vapors, and the like. Furthermore, additives such as colorants, plasticizers, flame retardants and the like that are typically incorporated in a plastic material, and add value to the virgin plastic, are lost. Accordingly, there is a need for an improved strategy and system for separating a plastic material from a mixture of other materials without the problems typically associated with conventional separation techniques.

BRIEF DESCRIPTION

In a first aspect, the present invention provides a process for separating two or more types of feedstock particles. The feedstock includes at least two types of particles each having a different specific gravity. The process comprises dispersing the particles into a first fluid having a specific gravity between that of the lightest and the heaviest particles in the feedstock and creating a slurry. The process then comprises feeding the dispersed particles slurry into a first hydrogravity tank such that most particles with a specific gravity less than that of the first fluid float, and most particles with a specific gravity greater than that of the first fluid sink. The process also comprises removing the floating particles from the first hydrogravity tank to form a first product stream and removing the sinking particles from the first hydrogravity tank to form a second product stream. The process further comprises directing at least one of the product streams from the first hydrogravity tank to a second cycle of dispersing and feeding operations using a second fluid with substantially the same specific gravity as the first fluid used in the first hydrogravity tank. The second cycle includes feeding the directed first or second product stream to a second hydrogravity tank such that most particles in the directed first or second product stream with a specific gravity less than that of the second fluid float, and most particles with a specific gravity greater than that of the second fluid sink. The process also comprises removing the floating and sinking particles from the second hydrogravity tank.

In a second aspect, the present invention provides a process for separating at least two types of particles from a feedstock. Each particle type has a different specific gravity. The process comprises forming an aqueous solution by adding to water, one or more of calcium chloride, calcium bromide, calcium nitrate and combinations thereof. The aqueous solution is formed to have a specific gravity between that of the lightest and the heaviest particles to be separated. The process also comprises removing at least about 90% of fines from the feedstock. After removal of fines, the process comprises creating a slurry by dispersing the feedstock in the aqueous solution. The process also comprises feeding the slurry into a first hydrogravity tank such that most particles with a specific gravity less than that of the aqueous solution float, and most particles with a specific gravity greater than that of the aqueous solution sink. The process also comprises removing the floating particles from the first hydrogravity tank to form a first product stream and removing the sinking particles from the first hydrogravity tank to form a second product stream.

In yet another aspect, the present invention provides a process for separating at least two types of particles from a feedstock. Each particle type has a different specific gravity. The process comprises forming an aqueous solution by adding to water one or more of calcium chloride, calcium bromide, calcium nitrate and combinations thereof. The aqueous solution is formed to have a specific gravity between that of the lightest and the heaviest particles to be separated. The process also comprises dispersing the particles into the aqueous solution to thereby create a slurry. The extent of the dispersion achieved is at least 90%. The process also comprises feeding the slurry to a first hydrogravity tank such that most particles with a specific gravity less than that of the aqueous solution float and most particles with a specific gravity greater than that of the aqueous solution sink. The process also comprises removing the floating particles from the first hydrogravity tank to form a first product stream. And, the process also comprises removing the sinking particles from the first hydrogravity tank to form a second product stream.

DETAILED DESCRIPTION

The system and process of the present invention is directed to reclaiming individual components from a solid feedstock comprising multiple components, each component having a different density or specific gravity from that of the other components. For example, a plastic component can be separated from various non-plastic components, including metals, various cellulosic materials such as woods, paper, and the like using the system and process of the invention. The multiple components or domains are often present in the form of layers, regions, areas, and the like. The term "domain" as used herein, refers to a portion of material, generally in particulate form, in a feedstock or feed stream which has the same or nearly the same, density or specific gravity. As a result of this characteristic, when that portion of material is slurried into a fluid and then allowed to respond to gravity and buoyance forces, it tends to form a common layer, region, or area within the slurry or liquid system. The material within a single domain is typically the same, and therefore; often, a domain is homogeneous, and each particle within a domain is homogeneous. The aspects are described in greater detail herein.

In a preferred process according to the present invention, articles and products which serve as feedstock and contain multiple domains such as layers or regions of two or more different solid components are reclaimed by a hydrogravity separation strategy. Initially, the feedstock is granulated to reduce the size of the multiple components into small particles of substantially a single component. The particles can be screened to remove "fines" and washed to remove dirt.

The particles are then slurried into an aqueous solution having a specific gravity which is intermediate to the specific gravity of the heaviest solid components and the lightest solid components of the slurry. The slurry is passed through a plurality of processing units. Each processing unit preferably contains a dispersion mixer to disperse any agglomerated particles, and a relatively quiescent hydrogravity separation tank which allows heavy components to sink and lighter components to float.

Since the separation of particles is not complete in any one processing unit, due to various types of inter-particle interference, slow floating or sinking times, etc., it is preferred to use a number of processing units to achieve a reasonably pure product stream that is marketable.

Examples of articles or products utilized as feedstocks in various embodiments of the invention include insulated wire or cable including metal such as aluminum, copper, or steel; plastic laminates or layered items; plastics items containing inorganic or other non-plastics; extrusion "bleeders"; recycled materials containing thermoplastics such as recycled carpeting or recycled consumer goods; vinyl-clad materials such as various window frames; door frames, and the like; automotive components including laminated or layered thermoplastic and/or thermoset parts; industrial material; and the like.

Examples of specific thermoplastic polymers which can be separated include, but are not limited to, polyolefins such as polyethylene and polypropylene; styrenic polymers; acrylic polymers; polyvinyl esters such as polyvinyl acetate; polyvinyl alcohol; chlorine-containing polymers such as polyvinyl chloride and polyvinylidene chloride; various fluorocarbon polymers such as polytetrafluoroethylene (PTFE), polyvinyl fluoride, and the like; polyamides, including various nylons; polyesters, including mylar, and polyethylene teraphthalate; polyurethanes; polycarbonates; silicon-containing polymers, copolymers of the above, and the like. Also included in this class are all compounds made with these polymers. Compounded plastics are comprised of the base plastic resin along with various additives to modify physical or chemical properties. These additives include inorganic fillers, plasticizers, colorants, impact modifiers, stiffeners, and the like.

Examples of specific thermoset polymers include various phenolic resins, various amino resins, various polyester resins, epoxy resins, various urethanes including urethane foams, various silicone resins, and the like including copolymers of various thermoset resins. They also include cross-linked versions of the thermoplastic species listed above, such as cross-linked polyethylene.

Other solid items which can be separated from other domains by hydrogravity separation include metals such as iron, nickel, platinum, platinum, silver, copper, gold, zinc, aluminum, tin, antimony, titanium, chrome, and the like. Still other solid items include various types of wood including plywood, particle board, etc., various types of paper including cardboard, corrugated paper, and the like.

Still other solid items which can be reclaimed include inorganic fillers such as silica oxides, metal carbonates, clay, limestone, alumina silicates, and the like.

In particular, the feedstock can comprise two or more components selected from the group consisting of (i) polyvinyl chloride, (ii) polyolefins, (iii) nylons (iv) fluorinated polymers (v) cellulose materials and (vi) metals.

The overall reclaiming system and process preferably includes, but is not limited to, the following operation stages: Granulation, air separation, slurrying, washing, drying, multi-stage hydrogravity separation, rinsing, and drying.

Granulation involves sizing the feed stock by cutting, shredding or grinding the same into suitably-sized particles of substantially single domains.

An optional step involves the use of air separation and/or dry screening of the particles at this point to remove paper and some fines which may hinder or inhibit subsequent operations.

Another optional step involves washing the particles using water and a suitable surfactant to remove dirt, dust, grime, and the like, yielding a more pure product downstream.

The cleaned and sized particles are then slurried into an aqueous solution. The aqueous solution has a specific gravity intermediate between that of the most dense particles and that of the least dense particles so that some particles will tend to float and other will tend to sink.

The slurry is fed to a dispersion mixer to sever, divide, and especially to break up agglomerated particles of the feedstock before they are added to a hydrogravity separation tank. It is important that each particle be free to float or sink as its specific gravity (and the specific gravity of the process fluid) dictates. If a heavy particle and a light particle were to remain agglomerated together, and were to report to a product stream, the agglomerate would introduce some measure of impurity into that product stream by virtue of the other particle in the agglomerate.

Dispersion mixers are preferably utilized before each hydrogravity separation tank.

A hydrogravity separation occurs in a largely quiescent tank preferably having steep angled walls generally greater than the angle of repose to prevent particle build-up thereon. A heavy product is recovered from the bottom of the tank, and a light product is recovered from the upper portion of the tank.

However, after one stage of separation, neither stream is pure. There are always some entrained particles that would have moved in the opposite direction but for the mass action of other particles surrounding it. Therefore, multiple separations at the same specific gravity are preferably performed to achieve a reasonably pure product. This is analogous to the multiple separation stages that occur in a distillation column to produce a pure liquid stream.

Another factor that can cause problems in a hydrogravity system is air bubbles. These bubbles can preferentially attach to certain types of particles, reducing their apparent specific gravity and causing them to float unexpectedly. The configuration of the preferred embodiment hydrogravity system, and the choice of surfactant chemicals, is designed to minimize bubble generation and froth flotation.

To achieve the required purity, either the light product stream, the heavy product stream, or both can be individually sent to another dispersion mixer and hydrogravity tank for a second stage of hydrogravity separation using a fluid of substantially the same specific gravity. This process can be repeated multiple times until the desired purity is achieved.

It is possible to operate a set of dispersion mixers and hydrogravity tanks in a configuration known in the mineral industry as "rougher—cleaner" wherein one stream is sequentially processed to improve product purity, and the other stream is recycled to an earlier dispersion mixer and hydrogravity tank to improve recovery.

The elevated specific gravity of the aqueous solution (relative to water) can be achieved by adding one or more inorganic salts or organo-metallic compounds to water to achieve a specific gravity greater than one. Suitable additives include certain metal hydroxides, metal halides, metal nitrates, metal formats and metal acetates.

The specific gravity of the process fluid is controlled to a point intermediate between that of the heaviest and that of the lightest particles in the slurry. This enables the heavy particles to sink and the lighter particles to float.

The viscosity of the process fluid should also be sufficiently low to allow particles to sink or float in a hydrogravity tank within the design residence time for the particular hydrogravity tank.

While the preferred embodiment of the present invention utilizes an aqueous system, it is within the scope of the present invention to utilize non-aqueous systems such as silicone solutions, oils including hydrocarbon and halohydrocarbon oils, dry cleaning fluids, and even liquid ammonia or carbon dioxide.

The selected separated particles from the last hydrogravity tank of a given set are collected. They can be washed, dried, and utilized for any desirable purpose such as reuse or resale, or they can be subjected to further hydrogravity separation in another dispersion mixer and hydrogravity tank operating at a different specific gravity.

The present invention will now be described with respect to reclaiming one or more solid components from a multi-component article such as an insulated copper cable. It will be understood that, as noted above, generally any article or product having multiple domains of different plastics or other components such as various plastics, metal, wood, etc., can serve as feedstock which is reclaimed with a high degree of purity.

Figure 1:
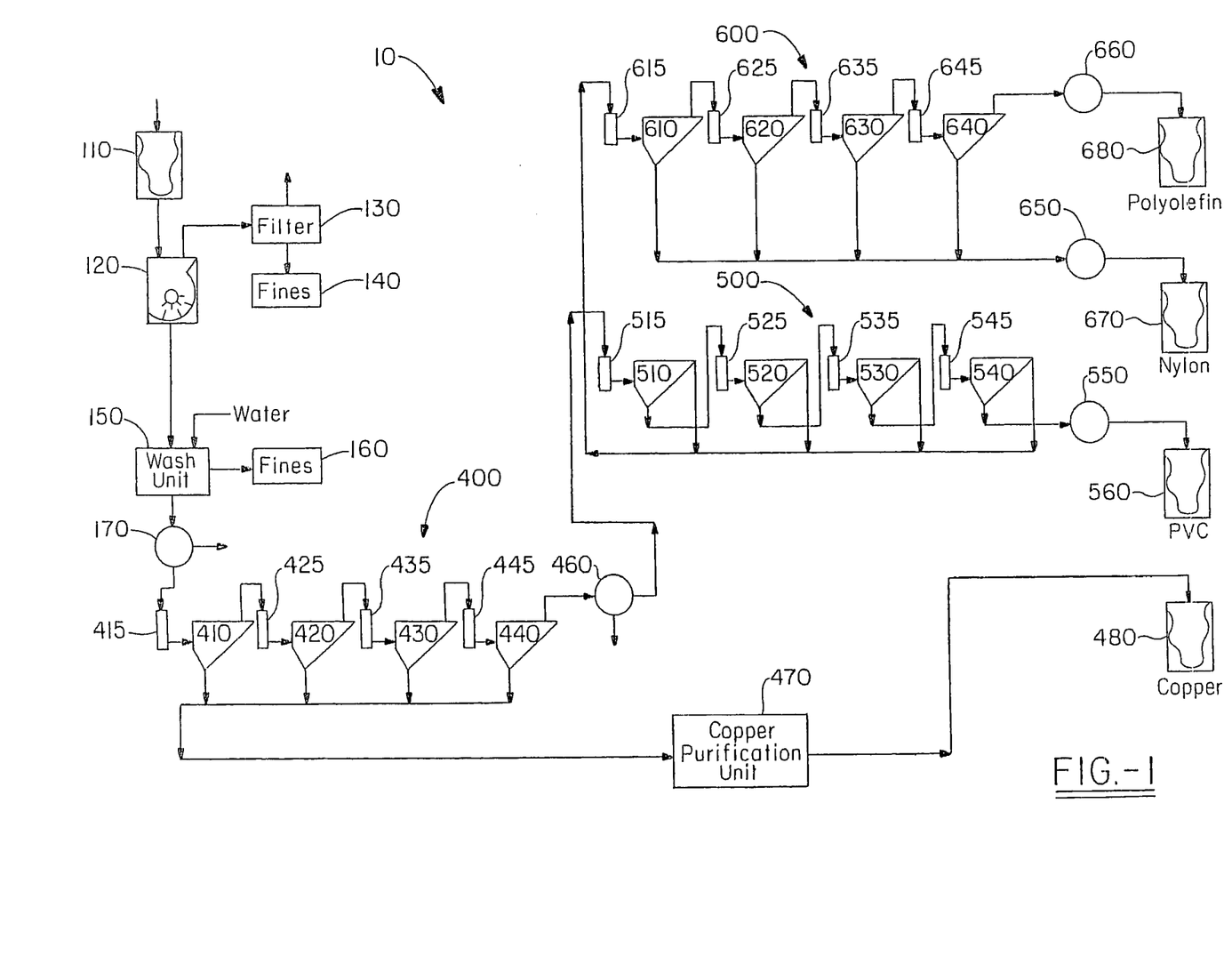
FIG. 1 is a schematic flow diagram of one embodiment of a hydrogravity reclaiming system of the present invention containing different operational stages for removal and purification of solid components having different specific gravities.

Referring to FIG. 1, a preferred embodiment hydrogravity system and process for reclaiming and purifying a solid feedstock is generally indicated by reference number 10. In one embodiment, the reclaimed article is a wire cable which contains a plurality of separated copper wires each surrounded with a thermoplastic such as polyethylene or other domain thermoplastic with the same being contained or encapsulated within an insulating thermoplastic such as polyvinyl chloride or other domain thermoplastic. The insulated cable has an outer jacket which is generally a thermoplastic nylon or other domain thermoplastic. In other embodiments, any number of domains can be present, including paper, rubber, string, and mylar.

The solid article, such as a copper cable, is initially cut into pieces less than 12 mm in length for primary copper recovery and fed from feedstock container 110 to granulator 120. Generally any type of cutting device or machine can be utilized with a reel type high shear cutting blade being desired. Primary copper recovery is generally accomplished using some form of air classification, using technology well known in the art. The light product from this stage, comprising the plastic insulation layers, the outer jacket, paper, dirt, and other contaminants is a desirable feedstock for the hydrogravity process.

The first process step is an optional feed pretreatment to remove any over-sized pieces and to protect downstream equipment. This can be accomplished in a screener with screen openings of approximately 12 mm. Materials suitable for further processing pass through the screen, while large pieces of "trash" are rejected. This screening device may also be "double decked", allowing the removal of some fine particles and dirt. In such an application, the material suitable for further processing is the middle fraction.

The next optional processing step involves one or more air separations at velocities typically lower than those used in the primary copper separation. The purpose of this air separation is primarily to remove paper, which tends to disintegrate in the hydrogravity process, forming a wet sludge in the tanks. This air separation can also be used to partially remove certain plastics that have the proper "shape factor". Species such as nylon and mylar tend to have the appearance of flat "flakes" while PVC, PE and the like tend to be more granular. The shape of the nylon and mylar particles causes them to be preferentially lifted in an air separation device, and concentrated in the lighter product fraction.

A granulator is then used to further reduce the feedstock particle size to about 6 mm or less. Generally any type of cutting device or machine can be utilized with a reel type cutting blade being desired. The purpose of the granulator is to size, that is to break, chop, shred, etc. the precut lengths into particles of 6 mm or less and more desirably from about 0.5 mm to about 4 mm. The granulator reduces the feedstock containing layers of different domains, regions, etc., into small particles containing substantially only one domain or component, e.g. a single thermoplastic or metal. Since the various layers, regions, etc., of the feedstock are only physically bonded, granulation of the same readily separates the various domains or components to produce particles of substantially only a single domain or component. Thus, the amount of any particles having two or more thermoplastic domains or components after granulation is very small, generally less than about 5% by weight, desirably less than about 3% by weight, and preferably less than about 1% by weight, or zero percent by weight based upon the total weight of the feedstock.

Granulators for producing metal and/or thermoplastic particles are well known in the art and generally any suitable granulator 120 can be utilized such as a CMG granulator, made in Italy. It has been found that granulators that use a sheering action to reduce particle size (as opposed to direct impact such as that found in a hammer-mill type device) tend to provide better separation of the domains in a feedstock.

The granulated particles often contain paper particles, dust and fines. Such fine particles can cause problems downstream, and are preferentially removed at this point. For reasons set forth below, fines are desirably removed and filtered or screened in unit 130 and collected in unit 140. Fine sized particles can vary but often have a maximum size of about 0.1 to about 1.0 mm in size.

The removal of fines from the particular article feedstock, while optional, is often an important aspect of the present invention. A high concentration of fines can tend to clog the reclaiming system because the fines generally do not rapidly settle or float in the hydrogravity tanks but remain in suspension. This phenomenon is largely described by Stokes Law. Generally any conventional method of removing the fines can be utilized such as air classification, air separation, or screening. For example, a screen containing openings of generally less than about 1.0 mm and desirably less than about 0.5 mm can be utilized to permit the fines to fall through. A vibrating or rotating screen is preferred. The fines can be collected in container 160. Preferably, at least about 90% by weight of the fines are removed from the feedstock prior to directing the feedstock, i.e. the particles, to one or more hydrogravity separation stages. More preferably, at least about 95%, and even more preferably, at least about 98% of the fines are removed from the feedstock.

The next optional step involves washing and drying the feedstock to remove dirt and grime.

To further remove dirt and grime, the particles are preferentially washed with water or a water-based solution containing a suitable surfactant. Referring to FIG. 1, the dry granulated particles often contain dirt, grime, and fines and are thus fed to wash unit 150 wherein they are mixed under high agitation to create a suspension of the particles in water. Any type of industrial washing device or a high agitation mixing tank can be utilized, with high shear agitation and/or turbulent flow being preferred. The washing step may be continuous or batch. One or more washing stages can be employed. The amount of the granulated feed is desirably such that the solids loading of the slurry in the wash unit is desirably from about 5% to about 40% by weight. Generally any conventional soap, surfactant, detergent, or wetting agent, known in the art which is non-foaming or low foaming can be utilized so long as it aids in wetting the granulated thermoplastic and copper particles. Suitable anti-foaming agents can also be added at this step to minimize undesirable foam generation.

It is usually desirable to then partially dewater or dry the particles to avoid diluting the subsequent solutions used for hydrogravity separation. This can be accomplished through centrifugation, air blowing, or the use of any type of industrial drier. Gala or Carter-Day type spin driers are particularly useful in this application. The use of the proper surfactant to lower surface tension in the prior washing step can assist in the physical removal of water in a spin drier.

Referring to FIG. 1, the washed thermoplastic and copper particles are substantially dewatered so when they are fed to a hydrogravity separator tank, dilution of the aqueous salt solution is prevented. Generally any type of drying process or apparatus 170 can be utilized with a mechanical or vibratory screen, basket centrifuge or a conventional spin dryer being preferred to remove the excess solution leaving a product having about 0% or about 0.1% to about 15% and desirably from about 3% to about 7% by weight of solution.

Washing and drying can also be accomplished by wet screening, optionally using spray bars to help force fines and dirt through the screen openings. An air jet on the lower part of the screen can be used to partially dry the plastic after washing.

While specific embodiments have been described with regard to the removal of undesired components from the feedstock such as dirt, angel hair, oversized particles, and fines, it is to be understood that numerous different types of operations and other embodiments can be utilized and that the same are within the concepts of the present invention.

The pretreated feedstock can now be subjected to hydrogravity separation to recover individual components of different specific gravity.

Each hydrogravity stage preferably includes a high shear dispersion mixer and a quiescent settling tank. In the mixer, the particles in the slurry are subjected to very high shear forces, causing any agglomerates to break up into their individual components. This allows each particle to act somewhat independently in the hydrogravity tank, allowing particles with a specific gravity heavier than that of the fluid to sink, and particles with a specific gravity lighter than that of the fluid to float. In this manner, two product streams are generated—a light product stream rich in low specific gravity components, and a heavy product stream rich in higher specific gravity components. These product streams can be removed continuously or intermittently.

The hydrogravity stages are arranged in groups of two or more. Generally 3 to 5 stages are optimum, although higher numbers can be employed to further increase purity.

A plurality of stages at essentially the same specific gravity is preferred, and is a significant aspect of the present invention, because no single float/sink stage is 100% effective. Rather, a float/sink stage tends to produce an upper product richer in the lighter components, and a lower product richer in the heavier components. The separation is not completely effective because there is always some inter-particle interaction and entrapment.

By way of example, assume a two-component feedstock and a hydrogravity separation efficiency of 90%. After one stage of separation, the desired product stream will contain about 90% of the desired product, and about 10% of the other material as a "contaminant". After a second stage of hydrogravity separation, the level of contamination is reduced to 1%. After a third stage of hydrogravity separation, the level of contamination is reduced to 0.1%, and after a fourth stage of hydrogravity separation, the level of contamination is reduced to 0.01%.

This sequential reduction in contaminants is a key benefit of the present invention.

Each group of hydrogravity stages preferably operates using a fluid with substantially the same specific gravity. Sequential groups of hydrogravity stages usually operate using fluids of different specific gravities.

In one embodiment, it is desirable to arrange a series of hydrogravity tank groups so that the specific gravity of the fluid increases as the particles move from one group of tanks to the next, or so that the specific gravity of the fluids continually decreases as the particles move from one group to the next.

With respect to a feedstock of copper cable particles containing a mixture of copper, nylon, polyvinyl chloride compound (PVC) and polyethylene compound (PE), the following sequence of hydrogravity tank groups has been found to be useful:

| Group | Fluid SG | Heavy Product | Light Product |
|-------|----------|---------------|---------------|
| 1 | 1.45 | Copper | Mixed plastics |
| 2 | 1.20 | PCV | Nylon and PE |
| 3 | 1.0 | Nylon | PE |

In another embodiment, it may be more desirable to perform the first separation using a group of hydrogravity stages at an intermediate density, with the light product going on to further separation with a lower specific gravity fluid, and the heavy product going on to further separation with a higher specific gravity fluid.

Each group comprises two or more hydrogravity separation units, and each hydrogravity separation unit comprises a dispersion mixer and a hydrogravity tank.

The hydrogravity fluid has two key properties—density and viscosity. The density must be such that the fluid density is intermediate between the density of the lightest and heaviest particles to achieve a hydrogravity separation. The viscosity must be sufficiently low to allow the particles to achieve sufficient vertical velocity in either the upward or downward direction to reach the upper or lower exit port in the nominal residence time of the slurry in the quiescent hydrogravity tank.

Tests with copper cable-derived granules indicate that the fluid viscosity should be desirably about 100 centipoise or less and more desirably about 25 centipoise or less and most desirably about 10 centipoise or less.

Useful hydrogravity fluids include pure water, as well as aqueous solutions of various salts or mixtures thereof. Salts which are highly soluble in water can be used to create desired specific gravities as low as about 1.001 or about 1.1 to as high as about 2.0 or about 3.0.

Suitable salts preferably are not corrosive or detrimental to the granulated particles, are capable of achieving a desired specific gravity for the particular operation stage, and produce a desired low viscosity. The salts or mixtures thereof are generally defined as ionic compounds containing an electropositive component and an electronegative component. Examples of positive components such as ions include alkali metals such as sodium and potassium, alkaline earth metals such as magnesium and calcium, and various transition metals (groups 3-15 of the periodic table) such as aluminum, tin, iron, zinc, and the like. The negative components such as ions include halogens such as chloride, oxygen or oxygen-containing compounds such as oxide, or hydroxide, or carbonate, nitrogen-containing compounds such as nitrates, nitrites, and the like, and, sulfur containing compounds such as sulfates, sulfites, sulfides and the like, or the non-metal portion of a metal complex, and the like. The salts should have a high solubility to achieve a sufficiently high fluid specific gravity for the process. Examples of specific suitable salts include potassium carbonate, zinc chloride, ferric chloride, ferrous chloride, calcium chloride, calcium nitrate, sodium chloride, sodium hydroxide, sodium zincate, magnesium chloride, various polytungstate complexes such as hydrated sodium heteropolytungstates, and mixtures thereof.

Another class of suitable aqueous specific gravity solutions are various drilling and completion fluids such as those generally utilized in well drilling. Such fluids are known in the art. An example of such drilling or completion fluids generally comprise water, a density increasing agent, and various stabilizers such as a clay stabilizing agent. Examples of such fluids are set forth in U.S. Pat. No. 4,536,297 which is hereby fully incorporated by reference. Another class of suitable aqueous solutions are suspensions of various particles in water. Suspensions can be a colloidal dispersion of particles, or obtained through the use of a dispersing aid, and the like. Suspended particles include magnetite such as $Fe_3O_4$, barite, shale, galena, clay, limestone, and the like. Such solutions are known in the art such as set forth in U.S. Pat. No. 5,240,626, which is fully incorporated by reference.

Yet another class of compounds found useful for the production of high density solutions are organo-metallic compounds such as the formate, acetate, or proprionic acid salt of various alkali metals, alkaline earth metals, or transition metals. These include compounds such as sodium formate, potassium acetate, calcium propionate, cesium formate, and the like.

In particular, the aqueous fluids can comprise one or more inorganic salts from the group consisting of (i) inorganic salts with alkali metals, (ii) inorganic salts with alkaline earth metals, (iii) inorganic salts with anions containing sulfur, (iv) inorganic salts with anions containing nitrogen, (v) inorganic salts with anions containing oxygen, and combinations thereof.

Moreover, the aqueous fluids can comprise one or more organometallic compounds selected from the group consisting of (i) organometallic compounds with alkali metals, (ii) organometallic compounds with alkaline earth metals, (iii) organometallic compounds with halogens, (iv) organometallic compounds containing nitrogen, (v) organometallic compounds containing sulfur, (vi) organometallic compounds containing oxygen, (vii) organometallic compounds with anions derived from formic acid, (viii) organometallic compounds with anions derived from acetic acid, (ix) organometallic compounds with anions derived from oxalic acid, (x) organometallic compounds with anions derived from oxalic acid, (xi) organometallic compounds with anions derived from citric acid, (xii) combinations thereof.

And, the aqueous fluids can comprise one or more of the compounds selected from the group consisting of calcium choloride, calcium bromide, calcium nitrate, zinc chloride, zinc bromide, magnesium chloride, potassium carbonate, polytungstate complexes, cesium chloride, cesium formate, cesium acetate, and combinations thereof.

High specific gravities generally require highly soluble salts. Often, salt solubilities are temperature sensitive, and the maximum solubility of a certain salt can be increased by increasing (or in some cases decreasing) the solution temperature.

Certain plastic compounds, such as some vinyl compounds, can contain heavy metal-based stabilizers, such as lead and tin. Some aqueous solutions used in this invention have the ability to leach a portion of these heavy metals from the plastic into the solution. Heavy metals in solution, even in the parts-per-million range, can complicate down-stream treatment or disposal requirements for the fluid.

It has been discovered that the presence of certain types of phosphates tend to prevent the leaching of heavy metals such as lead from plastics such as vinyl. While not bound by theory, it is believed that these phosphates cause the heavy metals to form an insoluble phosphate coating on their surface, hindering further dissolution. Fluids containing up to 1 wt % of one or more phosphate agents such as phosphoric acid or salts of phosphoric acid including mono sodium phosphate, di-sodium phosphate, tri-sodium phosphate, various potassium phosphates, and various alkali or alkali-earth phosphates are particularly useful. Also included in this class are the different forms of phosphate salts, including pyrophosphates, meta phosphates, and polyphosphates. Combinations of one or more of these agents are contemplated. The phosphates can also be included as an ingredient in the surfactant package.

It is also possible to increase salt solubilities and solution specific gravities by creating a mixture of two or more salts. While not wishing to be bound to any particular theory, it is believed that using dissimilar sized anions or cations negatively impacts the stability of the crystal structure, and causes higher concentrations of the salt to remain in solution. One such example is a mixture of calcium chloride and calcium nitrate. At room temperature one can achieve a maximum solution specific gravity of about 1.42 using calcium chloride alone, or a maximum solution specific gravity of about 1.50 using calcium nitrate alone. However, using a mixture of the two salts, one can achieve a specific gravity in excess of 1.60 without crystal formation.

A small amount of a soap, surfactant, detergent, or wetting agent is desirably utilized to reduce surface tension, to reduce interfacial tension between the fluid and the particles, to promote the release of air bubbles and to reduce the attraction between particles. A low-foaming or non-foaming surfactant is desirable, since the attachment of bubbles to particles may result in the inadvertent floating of heavy particles that were expected to report to the heavy product stream, decreasing the hydrogravity separation efficiency. This is quite the opposite of the "froth flotation" process, in which the generation of bubbles, and the attachment of bubbles to certain particles is an essential component of the process operation.

Generally any conventional soap, surfactant, etc., can be utilized such as household soaps, laundry detergents, industrial detergents, and the like. Other useful surfactants include DF12 available from Dow Chemical and LF60 available from DeForest. Foaming tendencies can also be compensated for through the addition of various anti-foaming or de-foaming agents such as poly dimethyl siloxane (PDMS).

Surfactants can generally be anionic, cationic, nonionic, amphoteric, and the like and the same are known in the art. Examples of other surfactants are set forth in 2003 McCutheon's Volume 1: Emulsifiers & Detergents (The Manufacturing Confectioner Publishing Company; Glen Rock, N.J.) which is hereby fully incorporated by reference. Whether a surfactant is suitable or not can be readily determined by adding various amounts to the aqueous solution containing particles of the various components and determining whether the particles are wetted out. Anionic surfactants ordinarily comprise alkyl hydrophobic hydrocarbon chains having terminal anionic hydrophilic polar groups such as carboxylate, sulfonate, sulfate, phosphonate and phosphate polar groups.

Another class of agents which has been found to promote particle dispersion in an aqueous system is various defoamers which are known in the art. Examples of suitable defoamers include compounds containing amorphous silica, various siloxanes such as polydimethyl siloxane, and the like such as Dow Corning 200, 1430, 1520, etc.

The amount of such surfactants, detergents, wetting agents, defoamers, etc., generally varies with the strength of the surfactant, the amount of "dirt" in the feedstock, and the chemical nature of the aqueous solution.

The preferred embodiment hydrogravity separation tank is designed to promote good separation of multiple domain feedstocks after granulation. In accordance with the present invention, generally one or more of the heaviest components are removed from the bottom of the hydrogravity separation tank as a heavy product slurry, and one or more of the lightest particles float to the top of the tank and are removed or skimmed off as a light product slurry. The specific gravity of the solution in the tank is thus generally intermediate between the specific gravity of the heaviest or most dense particles and the specific gravity of the lightest or least dense particles.

Accordingly, the specific gravity of the fluid is desirably at least about 0.01 g/cc lighter or heavier and preferably from about 0.05 g/cc to about 0.10 g/cc lighter or heavier than the specific gravity of any selected component particles.

In one embodiment, in any given stage of the reclaiming operation, substantially only a single heaviest particle component is removed from the bottom or only a single lightest particle component is removed from the top of the separation tank.

In another embodiment, in any given stage of the reclaiming operation, two or more types of heavy particles are removed from the bottom of the tank, or two or more types of light particles are removed from the top of the tank.

As noted above, it is an important aspect of the present invention that in order to obtain a high yield and purity of any specific particles of one or more components, such selected particles are fed to a plurality or multiple of subsequent hydrogravity separation stages wherein the removal operation is repeated with the selective component being reclaimed being transferred to all the tanks in one operational group of hydrogravity stages.

The number of such hydrogravity stages in any operational group can vary from at least 2 to about 10, desirably from about 3 to about 8, and preferably from about 3 to about 5 until the selected component(s) is highly purified. The specific gravity of the aqueous solutions in any plurality of hydrogravity separation stages of any single operational group is substantially the same.

An essential aspect of the hydrogravity stages is that they have an extremely turbulent, high shear mixer upstream of the hydrogravity tank to insure that the individual particles are not agglomerated, and are free to respond to the appropriate buoyancy forces in the subsequent hydrogravity separation tank. Preferably, the high shear mixer operates to disperse or break up or otherwise separate agglomerates or collections of particles. The extent of such dispersion or agglomerate separation is preferably at least about 90%, more preferably at least about 95%, and most preferably at least about 98%. These percentages refer to the percentage of feedstock particles, which are independent and free from being part of a collection or group of particles that are bound or otherwise attached to one another such that the bound collection acts as a large particle.

Figure 2:
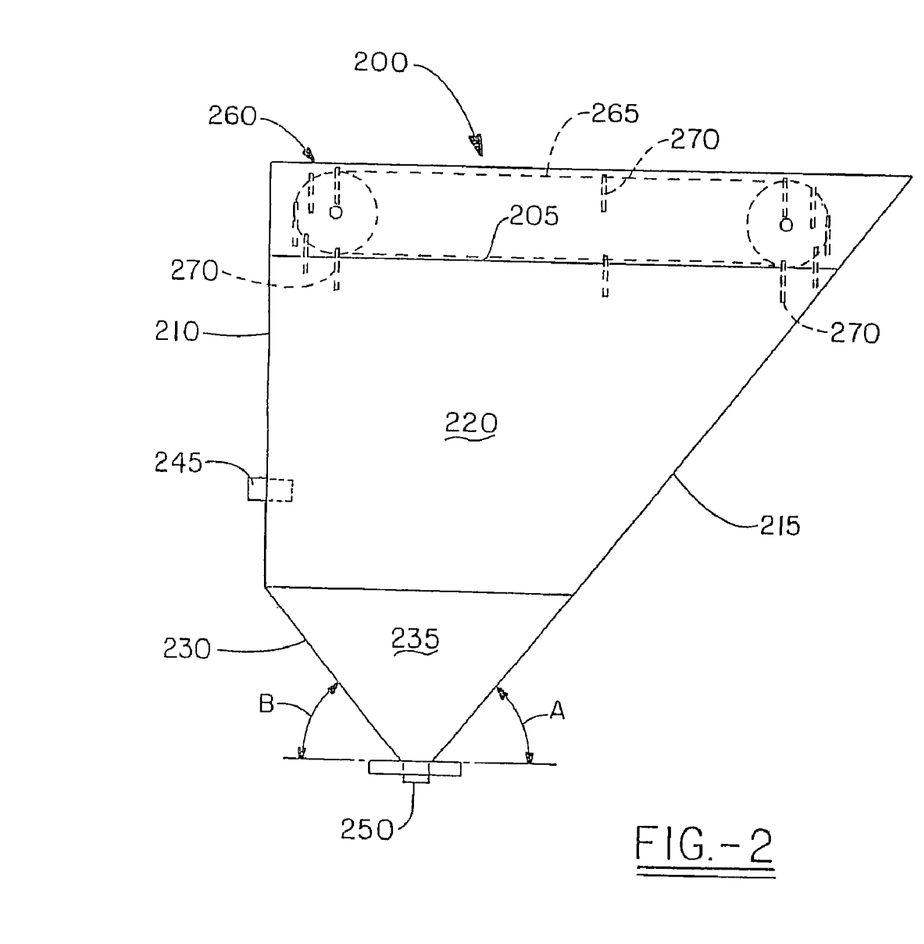
FIG. 2 is a side elevation view of a hydrogravity separation tank used in the system depicted in FIG. 1.

An essential aspect of the hydrogravity tanks is that they utilize a non-turbulent or slow flow rate such that the tank effectively separates the heaviest component(s) or separates the lightest component(s) from the remainder of the solution. Such a quiescent tank has sides and bottom surfaces which are greater than the angle of repose of the particles contained therein, thus eliminating and preventing build-up thereof. The angle of repose of the various sides will vary with the physical and chemical properties of the solution, the types of components such as plastic or metal, the shape of the particles, and the like. Generally, as shown in FIG. 2, any side surface or wall of the tank has an angle A or B of at least 45 degrees from horizontal. The angle of the various sides is generally at least 1 degree greater, desirably at least 5 degrees greater, and preferably at least about 10 degrees greater than the angle of repose of the particles of interest.

Figure 3:
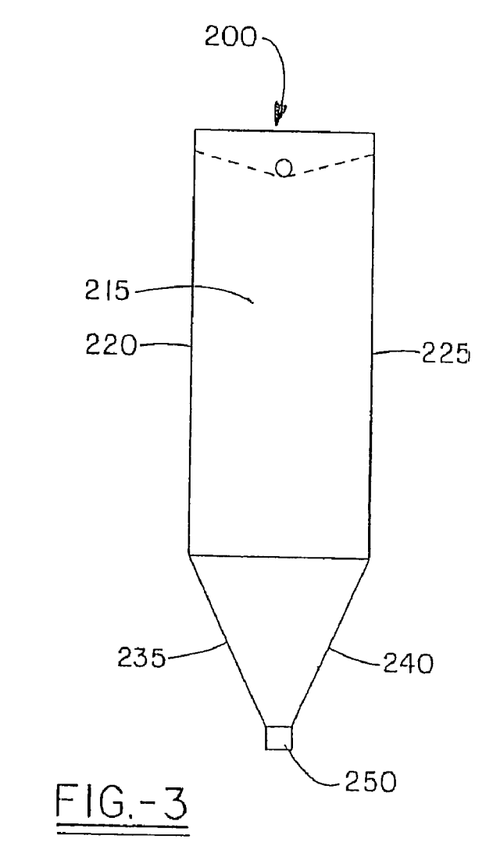
FIG. 3 is an end side elevation view of the hydrogravity separation tank.

The present invention provides numerous tank designs and configurations. One such configuration of a preferred embodiment tank of the present invention is set forth in FIGS. 2 and 3 wherein tank 200 has a top 205, a vertical upper first end wall 210, an inclined upper second end wall 215, and as shown in FIG. 3, generally vertical upper first and second side walls 220 and 225 respectively. The upper first end wall 210 of the upper portion of the tank extends into inclined lower first end wall 230. As shown in FIG. 3, the upper first side wall 220 also merges into an inclined lower first side wall 235 and the same is true of upper second side wall 225 which merges into inclined lower second side wall 240, all of which are oriented greater than the angle of repose.

Utilization of the above described hydrogravity separation tank of FIG. 2 thus permits the washed and dewatered particles from dryer 170 depicted in FIG. 1 to be fed through tank inlet 245 to tank 200 and subsequently separated into components, such as at least one component which is discharged as a slurry from the tank bottom egress 250.

Flow into the hydrogravity tank is controlled by the feed pump's rate and/or by control valves suitable for slurry service. The flow into the tank is split between the upper and lower egress points. Depending on the type of material being processed, and the amount of heavy or light material in the slurry, either egress can be operated in a continuous or an intermittent fashion. For example, one may choose to continually draw off a heavy product slurry from the bottom egress 250, or one may choose to normally close off this egress, allow the heavy product to accumulate in the bottom of the tank, and purge the tank periodically by briefly opening the egress.

As shown in FIG. 2, hydrogravity separation tank 200 in one embodiment optionally can contain skimmer 260 which comprises a conveyor type belt 265 having paddles 270 dependent therefrom. Rotation of conveyor 265 will cause the paddle to be immersed into the top of the aqueous solution and skim the floating particles to one edge of the tank where they are collected and transferred to a dispersion mixer 300 shown in FIG. 4 and described in greater detail herein. One or more simple rotational paddles can also be utilized to nudge the floating particles towards the upper tank egress. Otherwise, the floating particles can simply flow through an outlet opening, over a weir or through other types of removal devices known in the art to the next stage of the system or process. A suitable fluid spray or air stream could also be utilized to motivate floating particles towards the hydrogravity tank's upper egress.

As with the lower egress, the upper egress can be operated on a continuous or intermittent basis. For example, one may choose to continually draw off a light product slurry from the top of the hydrogravity tank, or one may choose to normally close off this egress, allow the light product to accumulate on the surface of the fluid in the tank, and purge the tank periodically by briefly opening the egress, and optionally turning on the skimmer, etc.

In accordance with the present invention, separation and purification of granulated solids of different components, e.g. plastic, metal, is conducted as opposed to purification of a solution. Separation of the various components is readily achieved when each feedstock component has a specific gravity at least about 0.01 particularly about 0.05, and desirably at least about 0.10 or at least about 0.15, different from another component.

Inasmuch as the various granulated particles upon immersion into an aqueous solution will tend to agglomerate due to surface tension, electrostatic, or other forces of attraction, it is desirable to utilize a dispersion mixer before each separation tank to disperse, sever, etc., such agglomerated particles.

Figure 4:
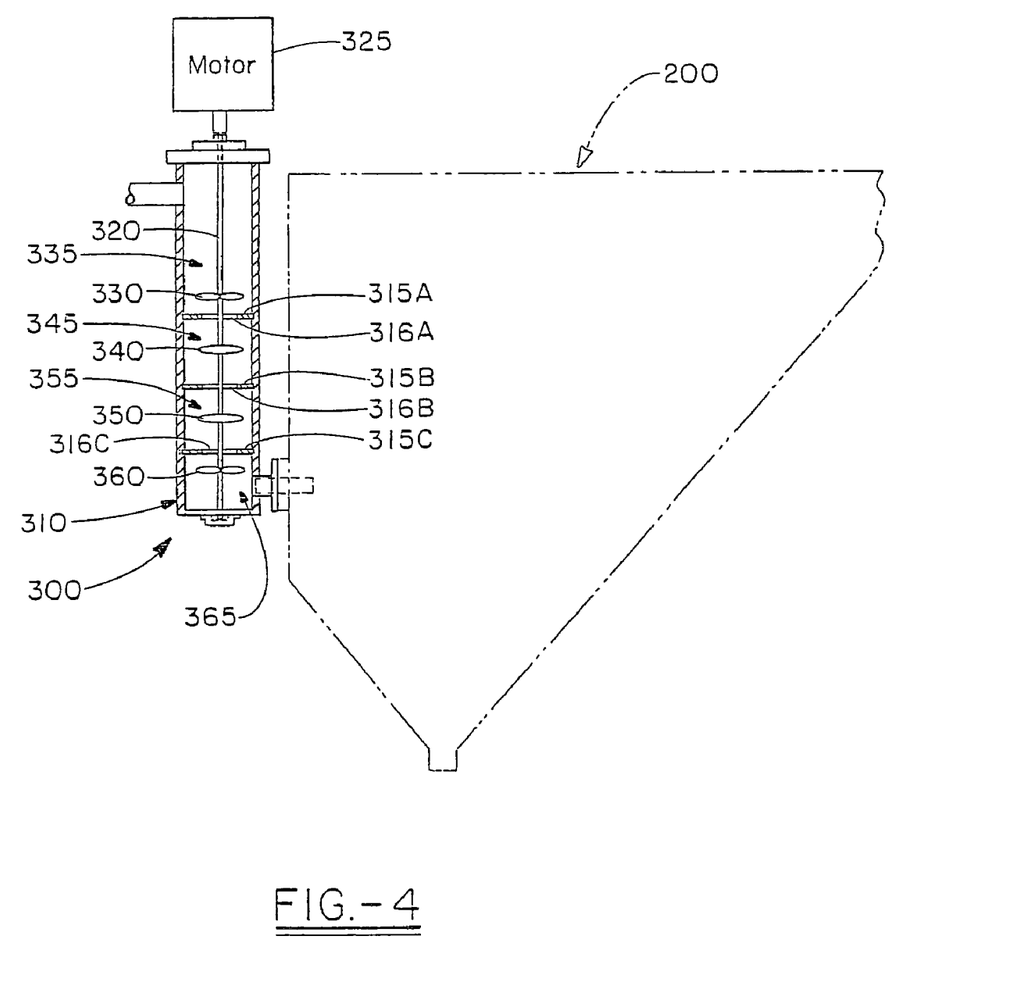
FIG. 4 is a cross-sectional view of a dispersion mixer used in the system of FIG. 1, which disperses agglomerated particles.

A dispersion mixer 300 shown in FIG. 4 is preferably located upstream of the first hydrogravity tank of the first removal stage and desirably also before every hydrogravity tank. The same practice applies with respect to the other removal stages of other component particles. Although dispersion mixer 300 can be a batch mixer, it is highly preferred that a continuous flow mixer be utilized. The dispersion mixer can be of any shape but desirably is elongated and can have one or more mixing zones, with a plurality of zones, such as from about 2 to about 10, and from about 3 to about 5 zones being preferred. Desirably dispersion mixer 300 is in the shape of an elongated tube or cylinder 310 and has a zone separation element such as an annulus 315 located between and defining each zone. Annulus apertures 316A, 316B and 316C can vary from zone to zone so long as each aperture is less than the tube diameter with a desired aperture area of from about 10% to about 50% and preferably from about 15% to about 30% or about 35% of the total tube diameter area. The linear location of each zone separation annulus 315 can vary so that each zone can be of any desirable length and each zone length need not be the same. The zone length to diameter ratio can be of from about 0.5 or about 0.8 to about 5 or about 10.

One or more shafts can be utilized to rotate a mixing impeller, with one axial shaft 320 being preferred, which extends through mixer 300 and can be rotated by any conventional apparatus such as motor 325. Generally two types of mixing impellers are utilized. The first is an axial mixing impeller 330, located in axial flow zone 335, which draws in and propels the granulated component particles into the mixer. While a plurality of mixing impellers can be contained in any zone, desirably only one mixing impeller is utilized in each zone. Any conventional impeller can be utilized in the first or ingress zone such as a marine propeller having two or more blades, or any other substantially axial flow generating impeller.

The aqueous solution containing the granulated particles therein is then forced through first annulus 315A into first radial flow zone 345 which contains a second type of mixing impeller, a radial flow dispersion impeller 340 designed to at least substantially break up any particles which have agglomerated. It is preferred that the radial flow dispersion impeller creates high shear and/or high turbulence to separate the agglomerated particles. Such impeller dispersion blades are more functional than a simple impeller since as the dispersion blades create a hydraulic action which tears agglomerated particles apart and disperses them uniformly throughout the solution. This is believed to be achieved by two different mechanisms. In the first, agglomerated particles contacting the blade are broken apart (sheared) and then in the intense turbulence surrounding the blade, particles contact one another at high speeds and are further broken up. This intense turbulence around the blade generally occurs at a zone extending a few inches outward therefrom and is called the zone of attrition. Beyond the turbulent zone the various particles are thoroughly mixed and dispersed. The diameter of the high shear and/or turbulent impeller 340 can vary in length but is generally from about 20% to about 75% and desirably from about 25% or about 30% to about 35% or about 55% of the dispersion mixer diameter. Various types of radial dispersion impeller blades are known in the art and can be utilized such as a Cowles®). impeller, a Hockmeyer impeller, or a so-called "high vane blade".

Referring again to FIG. 4, in a preferred embodiment of the present invention, the aqueous solution is fed from first radial flow zone 345 through second zone separation annulus 315B to a second radial flow zone 355 having a dispersion impeller 350 which further breaks up the agglomerated particles, etc., and further disperses the same into individual particles. The mechanisms are the same as with regard to first radial flow zone 345 and so a description of such will not be repeated.

In a preferred embodiment, the aqueous solution having a desired specific gravity flows through third zone separation annulus 315C into a fourth zone, which is a second axial flow zone 365 containing axial flow impeller 360. The axial flow impeller is desirably the same as axial flow impeller 330 and the same descriptions, along with the various other aspects of axial flow zone 365, will not be repeated. Of course, axial flow zone 365 serves to draw the aqueous solution from radial zone 355 into axial zone 365 and then expel it as through an egress in the mixer to a pipe or conduit leading to a subsequent hydrogravity separation tank and preferably to a mid-portion side inlet thereof.

The rpm of rotating shaft 320 can vary considerably depending upon desired throughput or flow rate but generally is from about 500 to about 5,000 and preferably from about 2,500 to about 3,500 rpm. The flow rate through mixer 300 will generally vary with the tube diameter as well as the diameter of apertures 316A, 316B, and 316C and can be from about 1 to about 150, desirably from about 10 to about 130, and preferably from about 20 to about 100 gallons per minute with respect to a dispersion mixer having a 10 inch diameter.

With respect to using a feedstock of copper cable particles, although generally any type of feedstock can be utilized, in the various reclaiming stages a selected component is separated out such as a metal or copper in a first stage. The washed and granulated dewatered feedstock comprising different domain thermoplastic particles as well as copper particles is continuously fed preferably to a plurality of sequential hydrogravity separator tanks wherein the copper, or other non-thermoplastic materials is separated from the thermoplastic components. Desirably before each tank they are fed to a dispersion mixer for de-agglomeration and subsequently fed to the mid-portion of a sequential hydrogravity tank. By "mid-portion" it is meant from about 10% to about 90%, desirably from about 20% to about 80%, and preferably from about 30% to about 70% of the total aqueous solution height in the tank.

While a specific dispersion mixer has been described in detail, it is to be understood that many variations thereof as well as other mixers can be utilized so long as they generally contain at least one and preferably a plurality of dispersion zones which serve to further break up the particles as through high shear and turbulence.

For example, a dispersion mixer can contain an inlet pump and/or an outlet pump in lieu of an impeller. Moreover, in the radial flow zones, high turbulence pumps can be utilized or a radial-type pump can be run backwards to produce high turbulence and/or shear.

The hydrogravity separation of a specific wire cable feed stock will now be discussed in view of the above principles, concepts, structures, and descriptions. As noted above, the wire cable comprises a plurality of copper wires each surrounded with a polyethylene thermoplastic with the same being encapsulated in polyvinyl chloride thermoplastic insulation. The outer jacket of the insulated cable is nylon thermoplastic.

Referring again to FIG. 1, the hydrogravity separation process described below comprises three groups 400, 500, and 600 of hydrogravity separation stages operating at fluid specific gravities of about 1.4, 1.2, and 1.0. Each group comprises four hydrogravity separation stages. Each separation stage includes a high shear dispersion mixer and a relative by quiescent hydrogravity separation tank.

The granulated, washed, and dewatered feedstock is slurried into an aqueous solution with a specific gravity of about 1.4 to form a slurry with a solids content of 1 to about 40% by weight. For example, a calcium chloride aqueous solution can be used. The slurry is fed to a first high shear dispersion mixer 415 which, is described herein above, the description, concepts, principles, etc. which are hereby incorporated by reference, contains a plurality of zones having a first axial flow zone, a first dispersion zone wherein a dispersion impeller breaks up agglomerated particles as by high shear and/or turbulence, a second radial dispersion zone followed by an axial output zone. The dispersed particles are then fed to one end of a first hydrogravity separation tank 410, the description, concepts, principles, etc., of which as set forth herein above such as with regard to tank 200 are hereby fully incorporated by reference. The specific gravity of the aqueous solution in tank 410, and all subsequent tanks 420, 430 and 440, is about 1.40 which is greater than substantially all of the thermoplastic domains or components but less than that of the copper component.

The viscosity of the calcium chloride aqueous solution is low, for example less than about 20 centipoise. The sides of tank 410 have an angle sufficient to prevent build-up of any copper solids and the flow rate throughout the tank is slow and generally free of any turbulence so that quiescent separation is achieved. That is, generally the particles have a low velocity component in the horizontal direction with a greater velocity flow component in either vertical direction.

After a desired residence time to permit good separation, the copper particles, along with a small amount of plastic particles are emitted from the bottom of tank 410 in the form of a slurry which is transferred to conventional purification unit 470. Any conventional purification unit can be utilized such as a concentrating table, e.g. a Deister or a Wilfley table, generally of a rectangular shape and tilted towards one corner so the copper particles are directed thereto and collected. The copper component particles are placed in storage unit 480.

The remaining thermoplastic domain particles of nylon, PVC and polyethylene either flow out of the top of the tank over a weir or are mechanically skimmed off and fed to second high shear dispersion mixer 425. The second dispersion mixer is desirably the same as the first mixer and thus has two radial flow zones for breaking up and separating various agglomerated particles which are primarily a thermoplastic. The various thermoplastic component particles are then fed to a second hydrogravity separation tank 420.

Tank 420 preferably contains essentially the same specific gravity aqueous solution as first separation tank 410 and in all aspects is desirably the same as first tank 410. In other words, the structure, flow, etc., can be a duplicate of the first hydrogravity separation tank. Thus, additional settled copper particles from the bottom of tank 420 are fed to purification unit 470 and the remaining floating particles are either skimmed or flow to third dispersion mixer 435 which is desirably the same as first dispersion mixer 415 and has multiple axial mixing zones, and multiple dispersion zones which further break up agglomerates.

In a similar manner, the system and process can be repeated any number of desirable times until essentially all of the copper component has been removed from the feedstock and has reported to the bottom of the hydrogravity separation tanks which all contain essentially the same structure and conditions as well as the same specific gravity aqueous solution as first tank 410, with the remaining thermoplastic particles being removed from the top of the tank and passed through a mixer having the same structure and conditions as first dispersion mixer 415 and then transferred to a succeeding tank. In the embodiment shown in FIG. 1, a total of four tanks are utilized including third hydrogravity separation tank 430, fourth dispersion mixer 445, and fourth hydrogravity separation tank 440.

In accordance with the concepts of the present invention, since predominantly copper was removed from the first operation stage, the remaining thermoplastic components are subsequently separated and purified via a plurality of dispersion mixers and hydrogravity separation tanks and contain very little, if any, remaining copper particles.

After the last hydrogravity tank in the first group, the aqueous product slurry is fed to de-watering device 460 to remove any adhering high specific gravity aqueous solution from the plastic particles and the solution returned to tank 410 (not shown) to minimize the amount of high specific gravity solution that is sent to the second group of hydrogravity stages which would alter the specific gravity of the subsequent tanks and potentially have a detrimental effect thereon. Generally any conventional dryer or de-watering device 460 can be utilized such as a fluid bed, a vibration screen, or a centrifuge dryer, with a spin dryer such as a Gala 3016 dryer manufactured by Gala Corporation being suitable.

The utilization of the above system and process with regard to a copper cable can result in a yield of generally at least 90%, desirably at least about 95% and preferably at least about 98% or about 99% percent by weight from copper purification unit 470 based upon the total weight of copper added to first separation tank 410. The purity of copper from purification unit 470, which separates thermoplastic particles from the copper, is generally at least about 80%, desirably at least about 90%, and preferably at least about 95% by weight based upon the total weight of material collected.

Considering the second group 500 of hydrogravity tanks of the present invention, the purified thermoplastic particles obtained from the last hydrogravity tank in the first group of hydrogravity separation states are fed to a series of a dispersion mixer and subsequent hydrogravity separation tank units desirably in accordance with the concepts, principles, structure and the description set forth hereinabove and for the sake of brevity will not be repeated. However, the same is hereby fully incorporated by reference with regard to all aspects thereon such as to the structure, shape, flow conditions of the various hydrogravity tanks, the type of dispersion mixers which utilize a plurality of zones having at least one axial flow zone and at least radial dispersion zone.

With respect to the copper cable example, the mixed plastic particles from the first set of hydrogravity tanks are slurried into an aqueous solution with a specific gravity of about 1.20. This slurry is then fed into another high shear dispersion mixer, and then into another hydrogravity tank. At a solution specific gravity of about 1.2, PVC will tend to sink, and lighter components such as nylon and PE will tend to float.

To further purify the PVC product, the product stream from the bottom of the first hydrogravity tank is fed into the high shear dispersion mixer of the second hydrogravity tank. The same process is repeated with the third and fourth hydrogravity stages in this group.

Any remaining domain thermoplastics such as polyethylene and nylon float to the top and are removed from the top of each tank. Optionally, the floating particles of nylon and PE can be re-processed through one or more additional high shear dispersion mixers and hydrogravity tanks to further remove any residual PVC from these streams. Such mixers and tanks would also contain a processing fluid with a specific gravity of about 1.20.

With respect to the copper cable example, the thermoplastic particles are first fed to high shear dispersion mixer 515 and then to quiescent hydrogravity tank 510 which have walls of non-repose and non-turbulent flow conditions with adequate residence times such that the various particles can separate from one another. Subsequently the lighter polyethylene and nylon are collected from the top of tank 510 and are fed to a third group of high shear dispersion mixers and hydrogravity tanks.

The polyvinyl chloride particles are collected from the bottom of first tank 510, fed to second dispersion mixer 525 where they pass through different mixing zones and are subjected to a dispersion impeller whereby any agglomerates are substantially broken into individual thermoplastic particles. The particles are then fed to a second hydrogravity tank 520 wherein the separation process is repeated. Thus, the lighter polyethylene and nylon particles float to the top and flow out of or are skimmed off the top of second tank 520 are then fed to the third group of dispersion mixers and hydrogravity tanks. The PVC particles settle out of the bottom of second tank 520 and are fed to third dispersion mixer 535, and then to third hydrogravity tank 530 for further separation. Once again, in a manner as described hereinabove, the polyethylene and nylon particles are separated and collected from the top of tank 530 and are fed to the third group of dispersion mixers and hydrogravity tanks. The PVC particles are collected from bottom of tank 530 and fed to fourth dispersion mixer 545 wherein agglomerates are severed and broken apart and fed to the fourth hydrogravity separation tank 540. In the fourth and last tank once again, remaining polyethylene and nylon particles that float to the surface are fed to the third group of dispersion mixers and hydrogravity tanks.

The PVC thermoplastic polymers which are collected from the bottom of fourth separation tank 540 are treated to remove the majority of the hydrogravity fluid for recycle using a screen, centrifuge, or preferably a spin dryer such as a Gala-type spin dryer indicated by unit 550. The PVC particles are washed to remove residual hydrogravity solution, and dried using one or more units such as a centrifuge, vibrating screen, or Gala-type spin dryer. Further drying can be accomplished in a fluid bed drier or in other types of plastic particle dryers known in the industry. The PVC component particles are then bagged, etc. and placed in storage unit 560 for subsequent reuse and/or sale. The aqueous solution from unit 550 is then recycled desirably to first hydrogravity tank 510.

In the third group 600 of dispersion mixers and hydrogravity tanks, the thermoplastic components of nylon and polyethylene particles from the second unit operation are slurried into an aqueous solution with a specific gravity of about 1.0. This slurry is fed to first dispersion mixer 615 and then to hydrogravity separation tank 610. As with the first set of hydrogravity tanks, the component which is desired to be cleaned or purified, PE, tends to float. These floating particles are recycled to a second dispersion mixer and hydrogravity tank, then to a third dispersion mixer and hydrogravity tank, and then to a fourth dispersion mixer and hydrogravity separation tank.

The heavy plastic component, predominantly nylon, can be removed and dewatered, or, optionally, can be send to another group of one or more dispersion mixers and hydrogravity tanks to further purify the nylon, removing any PE contamination.

The polyethylene-rich product slurry is dewatered, washed if necessary, and dried prior to packing in a manner similar to that described for PVC above.

The nylon-rich product slurry is dewatered, washed if necessary, dried, and packaged in a similar fashion.

Once again, with respect to the overall system and process of the third group of dispersion mixers and hydrogravity tanks, the concepts, principles, structures; and description as set forth hereinabove with regard to the mixers, the hydrogravity tanks, and the like are hereby fully incorporated by reference and hence will not be repeated.

Thus, the feed stream from the end of the second set of dispersion mixers and hydrogravity tanks is slurried into an aqueous fluid with a specific gravity of about 1. This slurry is fed to first dispersion mixer 615 wherein any agglomerated particles are substantially broken apart with the slurry then being fed to first hydrogravity separation tank 610 wherein the heavier nylon particles settle to the bottom of the tank and are collected, washed, and directly fed to nylon dryer 650. The specific gravity of the aqueous solution of all of the tanks of the third set of hydrogravity tanks are all essentially the same and are all slightly less than the specific gravity of nylon and hence is approximately 1.0. Thus, as with the first and second operation stages, if any or a small amount of a thermoplastic component is contained with the heaviest component or an agglomerated particle containing more than one domain, it will float to the top whereupon it is de-agglomerated and fed to a subsequent tank, and so forth until all of the heaviest component has been removed therefrom.

Accordingly, the particles which float to the top of first tank 610 are fed to second mixer 625 where agglomerated particles are broken apart, added to second dispersion mixer and hydrogravity separation tank 620 with the nylon collected from the bottom thereof and fed directly to nylon dryer 650 and the remaining floating polyethylene particles fed to third dispersion mixer 635. The process is once again repeated purifying the polyethylene particles by collecting the heavy nylon particles from the bottom of tank 630 and further breaking any agglomerated floating particles by feeding them to mixer 645. Finally, any remaining nylon particles are collected from the bottom of tank 640, washed, and dried in nylon dryer 650 with the remaining particles which float being purified polyethylene particles which are optionally washed, and fed to polyethylene dryer 660. Both nylon dryer 650 and polyethylene dryer 660, as before, can be any conventional dryer such as a centrifuge dryer, a fluid bed, vibrating screen with a spin dryer such as a Gala dryer being preferred. The separate dried nylon particles can be collected in storage unit 670 for subsequent use and/or sale. The polyethylene particles can also be dried and placed in storage unit 680 for subsequent use and/or sale. As before, the collected aqueous solution from dryers 650 and 660 are recycled to hydrogravity 610 to replenish the aqueous solution thereof.

It is essential to maintain clean process fluids to effect good particle separation. This involves removing dirt, fines, and any foreign materials. A number of methods can be used to continually or intermittently clean the fluids, such as clarification, centrifugation (solid bowl, screen bowl, or other), and filtration (gravity, pressure, or other). An excessive build-up of foreign particles in the process fluid will impair the ability of individual feed particles to quickly move in the direction indicated by specific gravity relative to the specific gravity of the process fluid.

Diluted fluids can be reconstituted continually or intermittently by evaporation, reverse osmosis, additional of solid salts, or other means known to one skilled in the art.

Fluids contaminated by excessive amounts of dissolved heavy metals can be purified by chemical treatment, electrochemical treatment, or other means known to one skilled in the art. For example, a build-up of lead or copper ions can be removed by precipitating the metallic ions (after suitable pH adjustment) with a soluble sulfide solution such as calcium polysulfide or sodium hydrogen sulfide, or with a gas such as hydrogen sulfide. Reagents that form a largely insoluble species of the offending metallic ion without precipitating the metallic ions used to create the high specific gravity salt solution are preferred. The precipitant can then be coagulated and/or flocculated and removed by suitable means such as clarification, filtration, etc.

Figure 5:
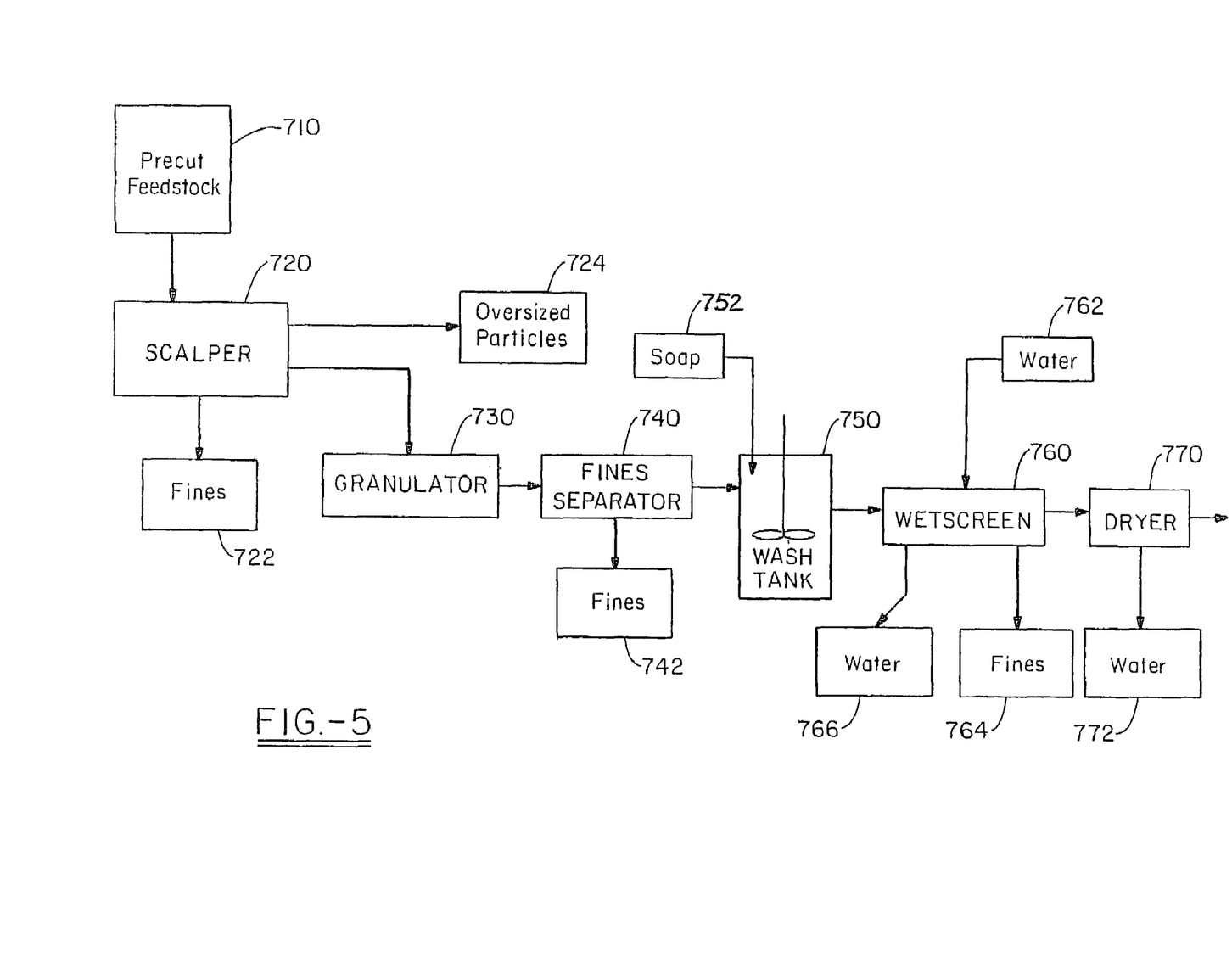
FIG. 5 is a schematic flow diagram of an alternate embodiment of a hydrogravity reclaiming system for removing oversized and fine particles.

Another embodiment of the present invention with respect to granulating feedstock particles and removing fines therefrom is set forth in FIG. 5. Precut feedstock 710 is fed to scalper 720 which removes and feeds to container 724 oversized particles such as those generally larger than 12 mm, fibers, as well as angel hair which is generally strips or strings of fibers derived from paper, polymer, and the like. Fines fall through a fine size screen and are collected in container 722.

The remaining feedstock is fed to an optional air separator to remove additional paper and other light contaminants from the more desirable components of the feed.

The remaining feedstock is fed to granulator 730, which can be similar to that described above, wherein the feedstock is broken, chopped, shredded, etc. into small particles of from about 0.5 mm or about 1 mm to about 2 mm or about 3 mm or about 4 mm. The granulator separates the dry feedstock containing different components into particles substantially containing only one component such as a specific type of thermoplastic or metal. Since fines are undesired because they can become suspended or entrained in the aqueous hydrogravity solution, they are removed by fine separator 740 which utilizes one or more fine screens to selectively remove fines and dirt and deliver the same to container 742.

The dry substantially single component particles are then subjected to a wet system which further removes fines and dirt. The water removal system comprises the various feedstock component particles which are fed to wash tank 750 generally having agitation therein, and contain soap, surfactants, wetting agents, etc., from tank 752. After the washing operation which may be batch or continuous, the wet feedstock particles are fed to wet screen operation 760 wherein water from tank 762 washes the particles to remove the soap or surfactant therefrom and is subsequently collected in container 766. If necessary, the particles can be subjected to another stage of washing in an agitated wash tank followed by another wet screening operation to enhance dirt removal. The removed fines and dirt are fed to container 764. The various washed feedstock component particles which are semi-wet are fed to any conventional dryer 770 such as a Gala dryer wherein water is removed to container 772. The dried multiple feedstock component particles can then be fed to any series of hydrogravity separation tanks to remove at least two different thermoplastics, through a plurality of mixing and hydrogravity separation steps.

The above described system and process will be better understood by reference to the following example which serves to illustrate but not to limit the present invention.

With respect to reclamation of 1000 pounds of residue from a particular copper cable "chopping" and primary copper recovery operation, and according to the format generally described hereinabove and shown in FIG. 1, 995 lbs. of feed stock was obtained from granulator 120 with the remaining 5 lbs. being recovered as fines. Depending upon the amount of residual copper metal in the cable feedstock, the amount of copper recovered from first operation stage 400 can range from about 10 lbs. to about 150 lbs. with the purity of the copper being generally at least about 80%, at least about 90%, or at least about 95% by weight, and preferably at least about 98% or at least about 99% by weight. The recovery of the PVC from the second operation stage 500 can range from about 750 to about 975 lbs. with the purity of the PVC being at least about 85% to at least about 90% or, desirably at least 95% by weight, and preferably at least about 98% or at least about 99% by weight of the total weight of the collected PVC stream.

The amount of the nylon and polyethylene being recovered from the third operation stage 600 each can independently vary from about 5 lbs. to about 100 lbs. based upon the total weight of both components with the purity of each component being at least 85% or at least about 90% by weight, desirably at least about 95% by weight, and preferably at least about 98% or at least about 99% by weight.

Generally, the system and process of the present invention readily recovers at least about 95%, desirably at least about 98%, and preferably at least about 99% by weight of the initial feedstock.

If desired, each of the above reclaimed component particles of PVC, polyethylene, and nylon can be further purified by additional hydrogravity separations, or by other methods known in the art if so desired.

While the present invention has been described with regard to a certain copper cable feed stock, it is understood that generally any type of solid feed stocks which contain multiple separable domains can be utilized including copper cable-derived feedstocks with significantly different relative compositions from those identified in this example, feedstocks containing other metals such as aluminum cable, or feedstocks with multiple domains that are derived from other than the wire and cable industry.

It should be emphasized that the above-described embodiments of the present disclosure are merely possible examples of implementations, set forth for a clearer understanding of the principles of the disclosure. Many variations and modifications may be made to the above-described embodiments without departing substantially from the spirit and principles thereof. All such modifications and variation are intended to be included herein within the scope of this disclosure.

We claim:

1. A process for separating two or more types of feedstock particles, the feedstock including at least two types of particles each having a different specific gravity, the process comprising:
   dispersing the particles into a first fluid having a specific gravity between that of the lightest and the heaviest particles in the feedstock and creating a slurry;
   feeding the dispersed particle slurry into a first hydrogravity tank, such that most particles with a specific gravity less than that of the first fluid float, and most particles with a specific gravity greater than that of the first fluid sink;
   removing the floating particles from the first hydrogravity tank to form a first product stream and removing the sinking particles from the first hydrogravity tank to form a second product stream;
   directing at least one of the first and second product streams from the first hydrogravity tank to a second cycle of dispersing and feeding operations using a second fluid with substantially the same specific gravity as the first fluid used in the first hydrogravity tank, wherein the second cycle includes feeding the directed at least one product stream to a second hydrogravity tank, such that most particles with a specific gravity less than that of the second fluid float, and most particles in the directed at least one product stream with a specific gravity greater than that of the second fluid sink; and
   removing the floating and sinking particles from the second hydrogravity tank.

2. The process according to claim 1 wherein each particle consists essentially of a single component.

3. The process according to claim 1 wherein two or more of the particle types in the feedstock have a specific gravity difference of at least 0.01.

4. The process according to claim 1 wherein the first and second fluids are aqueous.

5. The process of claim 1 wherein the floating particles from the second hydrogravity tank form a third product stream and the sinking particles from the second hydrogravity tank form a fourth product stream, the process further comprising:
   directing one of the third and fourth product streams from the second hydrogravity tank to a third cycle of dispersing and feeding operations using a third fluid with substantially the same specific gravity as the second fluid used in the second hydrogravity tank, wherein the third cycle includes feeding the directed third or fourth product stream to a third hydrogravity tank, such that most particles in the directed third or fourth product stream with a specific gravity less than that of the third fluid float, and most particles with a specific gravity greater than that of the third fluid sink.

6. The process of claim 1 wherein the feedstock comprises a mixture of at least two plastic components.

7. The process of claim 6 wherein the plastic components include a first plastic component and a second plastic component, the first and second plastic components having different specific gravities.

8. The process of claim 7 wherein the first and second plastic components each comprise the same type of plastic.

9. The process according to claim 1 wherein the feedstock comprises a mixture of at least three different plastic components.

10. The process according to claim 1 wherein the feedstock comprises a mixture of at least one plastic and one metallic component.

11. The process according to claim 1 wherein the feedstock comprises a mixture of two or more components selected from the group consisting of plastics, metallics, cellulosic materials, rubber materials, and combinations thereof.

12. The process according to claim 1 wherein the feedstock is derived from electrical wire and cable including copper conductors, aluminum conductors, or both.

13. The process according to claim 1 further comprising:
   forming a third product stream of floating particles from the second hydrogravity tank;
   forming a fourth product stream of sinking particles from the second hydrogravity tank; and
   subjecting at least one of the third and fourth product streams from the second hydrogravity tank to another cycle of dispersing and feeding operations using a third fluid having a specific gravity different from the specific gravity of the first fluid.

14. The process according to claim 1 wherein the feedstock comprises two or more components selected from the group consisting of (i) polyvinyl chloride, (ii) polyolefins, (iii) nylons (iv) fluorinated polymers (v) cellulose materials and (vi) metals.

15. The process according to claim 4 wherein each of the aqueous fluids comprises one or more inorganic salts selected from the group consisting of (i) inorganic salts with alkali metals, (ii) inorganic salts with alkaline earth metals, (iii) inorganic salts with halogens, (iv) inorganic salts with anions containing nitrogen, (v) inorganic salts with anions containing sulfur, (vi) inorganic salts with anions containing oxygen, and combinations thereof.

16. The process according to claim 4 wherein each of the aqueous fluids comprises one of more organometallic compounds selected from the group consisting of (i) organometallic compounds with alkali metals, (ii) organometallic compounds with alkaline earth metals, (iii) organometallic compounds with halogens, (iv) organometallic compounds containing nitrogen, (v) organometallic compounds containing sulfur, (vi) organometallic compounds containing oxygen, (vii) organometallic compounds with anions derived from formic acid, (viii) organometallic compounds with anions derived from acetic acid, (ix) organometallic compounds with anions derived from oxalic acid, (x) organometallic compounds with anions derived from propanoic acid, (xi) organometallic compounds with anions derived from citric acid, and (xii) combinations thereof.

17. The process according to claim 4 wherein each of the aqueous fluids comprises one of more of the compounds selected from the group consisting of calcium chloride, calcium bromide, calcium nitrate, zinc chloride, zinc bromide, magnesium chloride, potassium carbonate, polytungstate complexes, cesium chloride, cesium formate, cesium acetate, and combinations thereof.

18. The process of claim 17 wherein each of the aqueous fluids comprises a compound selected from the group consisting of calcium chloride calcium bromide, calcium nitrate, cesium formate, and combinations thereof.

19. The process according to claim 4 wherein the aqueous fluid is a drilling fluid or drilling completion fluid.

20. The process according to claim 1 wherein the feedstock is derived from recycled carpeting.

21. The process according to claim 1 wherein the feedstock is derived from recycle automobile components.

22. The process according to claim 1 wherein the feedstock is derived from recycled consumer goods.

23. The process according to claim 1 wherein the feedstock is derived from industrial material.

24. The process according to claim 1 further comprising:
prior to dispersing the particles into the first fluid, removing at least about 90% of the fines from the feedstock.

25. The process according to claim 24 wherein at least about 95% of the fines are removed.

26. The process of claim 1 wherein the extent of dispersion achieved by dispersing the particles into the first fluid is at least 90%.

27. The process of claim 26 wherein the extent of dispersion is at least about 95%.

28. The process of claim 1 wherein at least one of the first fluid and the second fluid comprises up to 1% by weight of a phosphate agent.

29. A recovered metallic product from the process of claim 1.

30. The product of claim 29 wherein the recovered metallic product is copper.

31. A recovered plastic product from the process of claim 1.

32. The product of claim 31 wherein the recovered plastic product is selected from the group consisting of polyvinyl chloride, polyethylene, nylon, and combinations thereof.

33. A process for separating at least two types of particles from a feedstock, each particle type having a different specific gravity, the process comprising:
forming an aqueous solution by adding to water, at least one agent selected from the group consisting of calcium chloride, calcium bromide, calcium nitrate and combinations thereof wherein the aqueous solution is formed to have a specific gravity between that of the lightest and the heaviest particles to be separated;
removing at least about 90% of fines from the feedstock;
after removal of fines, creating a slurry of dispersing the feedstock in the aqueous solution;
feeding the slurry into a first hydrogravity tank, such that most particles with a specific gravity less than that of the aqueous solution float, and most particles with a specific gravity greater than that of the aqueous solution sink; and
removing the floating particles from the first hydrogravity tank to form a first product stream and removing the sinking particles from the first hydrogravity tank to a form a second product stream.

34. The process of claim 33 wherein at least about 95% of fines are removed from the feedstock.

35. The process of claim 33 wherein the specific gravity of the aqueous solution is in the range of from about 1.001 to about 3.0.

36. The process of claim 33 further comprising:
directing at least one of the first and second product streams from the first hydrogravity tank to a second hydrogravity tank using a second aqueous solution having substantially the same specific gravity as the first aqueous solution, such that most particles in the directed product stream with a specific gravity less than that of the second aqueous solution float, and most particles in the directed product stream with a specific gravity greater than that of the second aqueous solution sink.

37. The process of claim 33 wherein the aqueous solution is the first aqueous solution, the process further comprising:
directing at least one of the first and second product streams from the first hydrogravity tank to a second aqueous solution different than that of the first aqueous solution, such that most particles in the directed product stream with a specific gravity less than that of the second aqueous solution float, and most particles in the directed product stream with a specific gravity greater than that of the second aqueous solution sink.

38. At least two types of particles separated by the process of claim 33, wherein each particle type has a specific gravity that is at least about 0.01 different from another particle type in the feedstock.

39. A process for separating at least two types of particles from a feedstock, each particle type having a different specific gravity, the process comprising:
forming an aqueous solution by adding to water, at least one agent selected from the group consisting of calcium chloride, calcium bromide, calcium nitrate, and combinations thereof wherein the aqueous solution is formed to have a specific gravity between that of the lightest and the heaviest particles to be separated;
dispersing the particles into the aqueous solution to thereby create a slurry, wherein the extent of dispersion achieved is at least about 90%;
feeding the slurry into a first hydrogravity tank, such that most particles with a specific gravity less than that of the aqueous solution float, and most particles with a specific gravity greater than that of the aqueous solution sink;
removing the floating particles from the first hydrogravity tank to form a first product stream; and
removing the sinking particles from the first hydrogravity tank to form a second product stream.

40. The process of claim 39 wherein the extent of dispersion is at least about 95%.

41. The process of claim 39 wherein the specific gravity of the aqueous solution is in the range of from about 1.001 to about 3.0.

42. The process of claim 39 further comprising:
directing at least one of the first and second product streams from the first hydrogravity tank to a second hydrogravity tank using a second aqueous solution having substantially the same specific gravity as the first aqueous solution, such that most particles in the directed product stream with a specific gravity less than that of the second aqueous solution float, and most particles in the directed product stream with a specific gravity greater than that of the second aqueous solution sink.

43. The process of claim 39 wherein the aqueous solution is the first aqueous solution, the process further comprising:
directing at least one of the first and second product streams from the first hydrogravity tank to a second aqueous solution different than that of the first aqueous solution, such that most particles in the directed product stream with a specific gravity less than that of the second aqueous solution float, and most particles in the directed product stream with a specific gravity greater than that of the second aqueous solution sink.

44. At least two types of particles separated by the process of claim 39, wherein each particle type has a specific-gravity that is at least about 0.01 different from another particle type in the feedstock.

* * * * *